Figure 1:
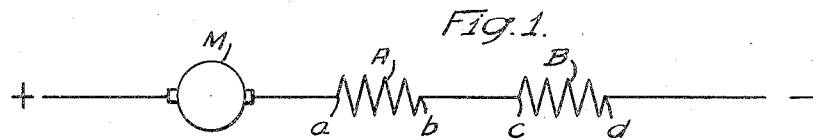

Patented Sept. 20, 1949

2,482,513

UNITED STATES PATENT OFFICE 2,482,513

MOTOR CONTROL SYSTEM

Charles Adrien Pierre Rossignol and Paul Marie Jacques Sèverin de Giacomoni, Paris, France, assignors to Westinghouse Electric Corporation, East Pittsburgh, Pa., a corporation of Pennsylvania Application July 3, 1947, Serial No. 758,846
In France October 9, 1945

Section 1, Public Law 690, August 8, 1946
Patent expires October 9, 1965

5 Claims. (Cl. 318—252)

Our invention relates generally to motor control systems and, more particularly, to systems for controlling the speed of electric motors of the series type.

It is known that one of the methods used to regulate direct current machines, especially series-type traction motors, consists in shunting the field of these motors by a resistor connected in parallel with the field coils so that the current flowing through the latter is different from the current flowing through the armatures.

The shunt resistances may be inductive or non-inductive, but in the case of motors highly susceptible to abrupt field variations it is practically indispensable that they be inductive, so that the current does not appear in these resistances instantaneously, since it is not produced instantaneously in the inductive turns of the motor.

In the case of motors which have a high rating or which are considerably shunted, shunt resistances, especially if they are inductive, have the great disadvantage of being heavy and cumbersome.

An object of the present invention is to regulate an electric machine which is excited in series, shunt or compound, under such conditions that, even in the case of non-inductive adjustable resistances, the latter cause no perceptible trouble in the establishment of current in the motor field and that in general the desired regulation can be obtained with resistances which are much lighter in weight and occupy much less space.

According to the present invention, this result is obtained by the fact that at least one of the inductive circuits, having a plurality of elements normally connected in series, is provided with devices by means of which said elements may be connected, for the regulation, in parallel or in series-parallel, the characteristics of the different branches being different, and by the fact that, furthermore, there are provided expedients by means of which it is possible to introduce, eventually, into at least one of these branches one or more adjustable resistances of some type or other.

It is immediately clear that, full field operation being obtained when the various elements of the sub-divided field coil are connected in series, as many different reduced values of this field will be obtained as there are different possible connections of said elements in series-parallel or in parallel. On the other hand, it is clear that if we introduce, besides, in one, or several, or even in all of the inductive branches thus constituted adjustable resistances connected in series with the field coils of these branches, we will obtain a range of field values practically as wide as can be desired.

We see that, owing to the fact that the resistances are in series with the inductive coils, the motor always retains a certain inductivity which is compatible with correct commutation. Up to now it used to be considered that this result could not be obtained except with the use of inductive resistances. It is, therefore, possible to save, in case of necessity, a considerable amount of weight. Besides, it is possible to keep the inductive properties unimpaired, by using branches with different characteristics but with the same number of turns.

The change of the field coils from series connection to series-parallel or parallel connection, as well as the introduction and regulating of the resistances can, of course, be obtained by any normal method.

Figure 3:
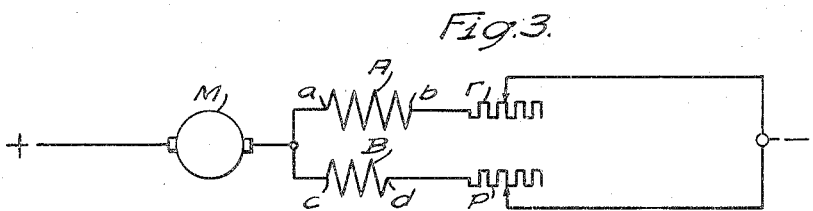
Figure 4:
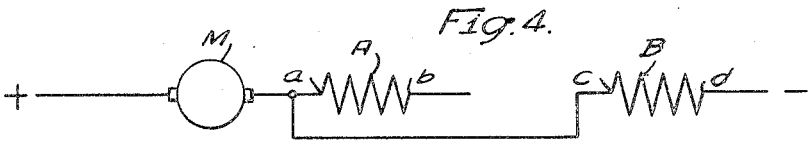
Figure 5:
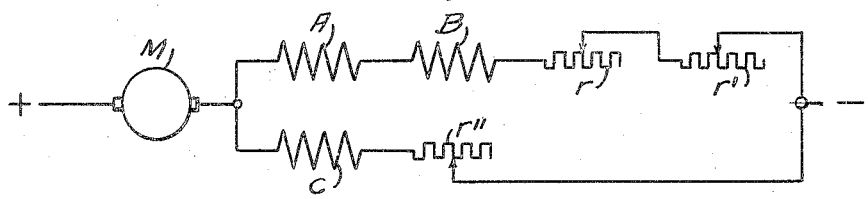
Figure 6:
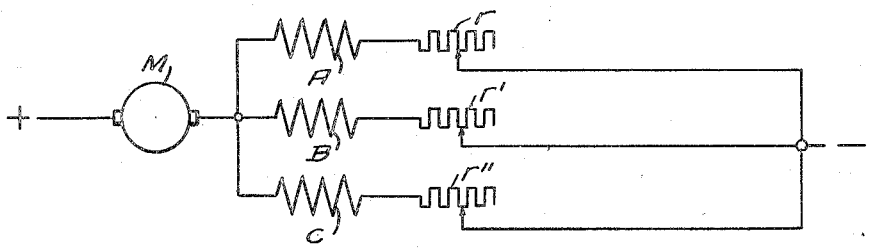
Figure 7:
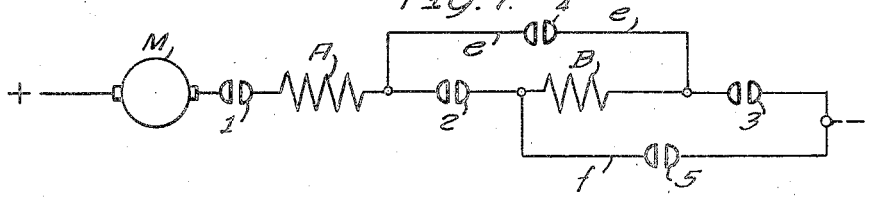
Figure 8:
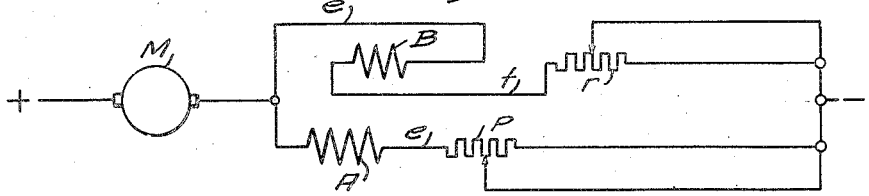

In order to illustrate the invention, the attached drawing shows, schematically and by way of example, different assemblies made with a series-excited motor whose field comprises either two elements as shown in Figures 1 to 4, or three elements as shown in Figures 5 and 6, or two elements connected in a special manner as shown in Figures 7 and 8.

Figure 9:
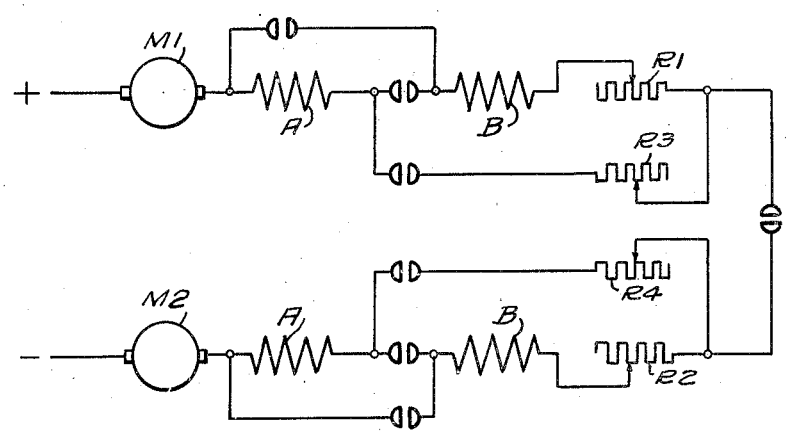
Figure 10:
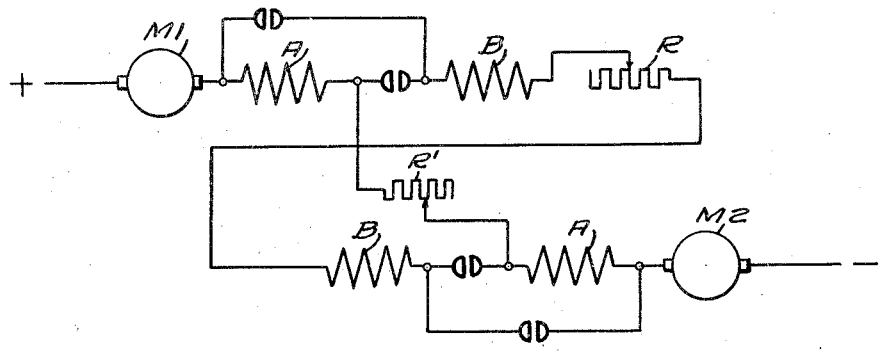

Figures 9 and 10 are diagrammatic views showing two motors connected in accordance with our invention.

In Figures 1 to 4, M is the armature of the motor, A and B are two field coils with different electric properties, each of the coils having its own entrance and exit, $a$ and $b$ for the first, $c$ and $d$, for the second. At full field operation, the two coils are connected in series as shown in Figure 1.

Figure 2:
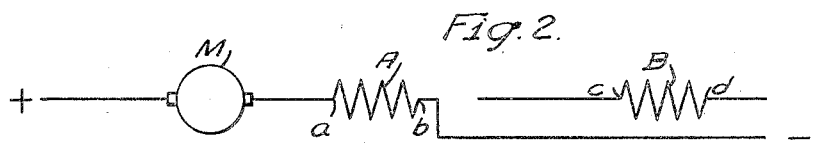
Figure 2B:
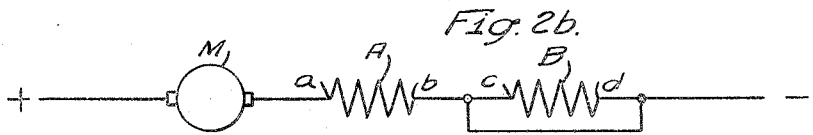

In order to obtain the first regulation step it suffices to disconnect the coil B, or to short-circuit it, according to a known method, as shown in Figures 2 and 2b.

The subsequent regulation steps are obtained, according to the invention, by connecting coils A and B in parallel. If necessary an adjustable resistance is connected in series with each of them, resistance *r* with A, and resistance *p* with B, as shown in Figure 3.

It is obvious that by a suitable modification of the position of the sliders on the resistances, or by acting upon suitably located contactors, it is possible to obtain the desired number of regulating steps. As stated hereinbefore, the motor will always retain an inductivity compatible with the commutation, owing to the fact that the resistances are in series with the coils.

Figure 4B:
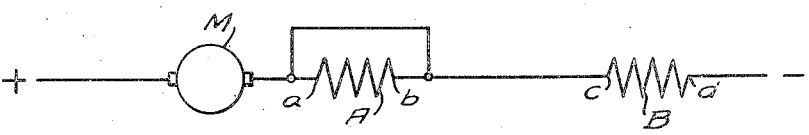

The last regulation step, as shown in Figs. 4 and 4b, will be obtained by eliminating the resistances and disconnecting or short-circuiting A, B being supposed to have fewer turns than A.

If one multiplies the number of coils, one can connect them, for the regulation, in various ways, series-parallel or parallel, each one of the branches thus formed including, if necessary, its regulating resistance or resistances in series with this branch.

Thus, Figs. 5 and 6 show a series excitation motor with three field coils A, B, C, connected for the regulation either in series-parallel (Fig. 5), with the addition of adjustable resistances *r, r'* or *r''*, connected into the two parallel branches AB, or C; or else, they are connected in parallel (Fig. 6) with the addition of the adjustable resistances *r, r'* or *r''*.

It has been said above, with reference to the connections represented in Figures 1 to 4, that the coils A and B must have different characteristics. As a matter of fact, if the characteristics were the same, there would be no point in connecting A and B in parallel, since this would give the same regulation step as would the short-circuiting of one of them.

Figs. 7 and 8 represent a variation which is applicable to a very special case of a field having two coils, the number of turns of A being larger than that of B.

In Fig. 7, the two coils are connected to each other, to the armature, and to the network, by contacts 1, 2, 3, or by any other suitable device. Besides, conductors *e* and *f* are arranged as shown in Figure 7 with a contactor, 4 and 5, respectively, in each circuit. The contactors 4 and 5 are assumed to be open, whereas contactors 1, 2 and 3 are assumed to be closed. The coils A and B are in series, which produces a full field.

If the contactors 4 and 5 are closed and contactors 2 and 3 are open, coil B is in opposition to coil A, and the value of the resulting field is equal to the difference between the fields A and B, which constitutes a new point of regulation.

If, according to the invention, and maintaining the inversion of B, one connects this coil in parallel with A, and if adequate adjustable resistances *r* and *p* are connected in series with these coils, the assembly shown in Fig. 8 is obtained.

Of course, if the motor has a larger number of field coils, both types of assembly can be combined, i. e., reversed and non-reversed coils.

The arrangements heretofore described and illustrated refer to the regulation of individual motors. The invention represents additional advantages when applied to the regulation of motor groups, as shown by way of illustration, in Figs. 9 and 10, which represent, for two series-connected series-motors M1 and M2, a method of regulation according to the invention. Figure 10 shows a simplification of the regulation of the resistances.

A mere examination of these diagrams will make it clear to a specialist that the additional improvement consists in the simplification of the resistance regulators or of the number of contactors required to obtain the arrangement of regulation steps. Thus, in Figure 9, four resistors R1, R2, R3 and R4 are required while in Figure 10 only two resistors R and R' are required.

The assemblies described and illustrated by way of example, refer, as we have seen, to direct current series motors, but it is clear that the same methods are applicable to any direct current motor, no matter what the method of its excitation, as well as to any alternating current motor which lends itself to regulation through the field.

It is also clear that, if a motor assembled according to the invention, functions as a generator, for instance in the case of rheostatic braking during traction, it can be regulated in the same way, so that it is obvious that this method of regulation can be used for generators of any type.

Since numerous changes may be made in the above-described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. A system for regulating the speed of an electric motor having an armature winding and a plurality of field coil windings, said field coil windings having different characteristics, comprising means for connecting said field coil windings first in series and later in parallel-circuit relation, and an adjustable resistor connected in series-circuit relation with each one of the parallel-connected field winding circuits.

2. A system for regulating the speed of an electric motor having an armature winding and a plurality of field coil windings, said field coil windings having different characteristics, comprising means for connecting said field coil windings first in series and later in parallel-circuit relation, means for disconnecting part of the field coil windings from the field circuit, and an adjustable resistor connected in series-circuit relation with each one of the parallel-connected field winding circuits.

3. A system for regulating the speed of an electric motor having an armature winding and a plurality of field coil windings, said field coil windings having different characteristics, comprising means for connecting said field coil windings first in series and later in parallel-circuit relation, and an adjustable resistor connected in series-circuit relation with each one of the field winding circuits.

4. A system for regulating the speed of an electric motor having an armature winding and a plurality of field coil windings, said field coil windings having different characteristics, comprising means for connecting said field coil windings first in series and later in parallel-circuit relation, means for disconnecting part of the field coil windings from the field circuit and adjustable resistors connected in series-circuit relation with the field winding circuits.

5. A system for regulating the speed of an electric motor having an armature winding and a plurality of field coil windings, said field coil windings having different characteristics, comprising means for connecting said field coil windings first in series and later in parallel-circuit relation, means for short-circuiting part of the field coil windings, and an adjustable resistor connected in series-circuit relation with each one of the parallel-connected field winding circuits.

CHARLES ADRIEN PIERRE
ROSSIGNOL.
PAUL MARIE JACQUES
SÈVERIN DE GIACOMONI.

REFERENCES CITED

The following references are of record in the file of this patent:

UNITED STATES PATENTS

| Number | Name | Date |
|---|---|---|
| 420,469 | Serrell et al. | Feb. 4, 1890 |
| 542,667 | Wightman | July 16, 1895 |
| 960,896 | Gruenfeldt | June 7, 1910 |
| 1,189,947 | Henderson | July 4, 1916 |
| 1,387,466 | Candee | Aug. 16, 1921 |
| 1,454,867 | Taliaferro | May 15, 1923 |
| 2,350,680 | Heintz | June 6, 1944 |